(12) United States Patent
Dettling et al.

(10) Patent No.: US 8,119,075 B2
(45) Date of Patent: Feb. 21, 2012

(54) DIESEL PARTICULATE FILTERS HAVING ULTRA-THIN CATALYZED OXIDATION COATINGS

(75) Inventors: Joseph Charles Dettling, Howell, NJ (US); Yuejin Li, Edison, NJ (US)

(73) Assignee: BASF Corporation, Florham Park, NJ (US)

( * ) Notice: Subject to any disclaimer, the term of this patent is extended or adjusted under 35 U.S.C. 154(b) by 1168 days.

(21) Appl. No.: 11/271,004

(22) Filed: Nov. 10, 2005

(65) Prior Publication Data

US 2007/0104623 A1    May 10, 2007

(51) Int. Cl.
*B01D 50/00* (2006.01)
(52) U.S. Cl. .................................................. 422/180
(58) Field of Classification Search .................. 422/168, 422/180, 211, 212; 502/2, 324, 506
See application file for complete search history.

(56) References Cited

U.S. PATENT DOCUMENTS

| | | | |
|---|---|---|---|
| 3,904,551 A | 9/1975 | Lundsager et al. |
| 4,329,162 A | 5/1982 | Pitcher |
| 4,340,403 A | 7/1982 | Higuchi et al. |
| 4,364,760 A | 12/1982 | Higuchi et al. |
| 4,403,008 A | 9/1983 | Factor |
| 4,510,265 A | 4/1985 | Hartwig |
| 4,519,820 A | 5/1985 | Oyobe et al. |
| 4,559,193 A | 12/1985 | Ogawa et al. |
| 4,563,414 A | 1/1986 | Ogawa et al. |
| 4,624,940 A | 11/1986 | Wan et al. |
| 4,708,946 A | 11/1987 | Ohata et al. |
| 4,714,694 A | 12/1987 | Wan et al. |
| 4,727,052 A | 2/1988 | Wan et al. |
| 4,902,487 A | 2/1990 | Cooper et al. |
| 5,057,483 A | 10/1991 | Wan et al. |
| 5,100,632 A | 3/1992 | Dettling et al. |
| 5,157,007 A | 10/1992 | Domesle et al. |
| 5,417,956 A | 5/1995 | Moser |
| 5,460,701 A | 10/1995 | Parker et al. |
| 5,466,646 A | 11/1995 | Moser |
| 5,491,120 A | 2/1996 | Voss et al. |
| 5,514,349 A | 5/1996 | Parker et al. |
| 5,597,771 A | 1/1997 | Hu et al. |
| 5,627,124 A | 5/1997 | Farrauto et al. |
| 5,716,899 A | 2/1998 | Guile et al. |

(Continued)

FOREIGN PATENT DOCUMENTS

DE    4105534    2/1991

(Continued)

OTHER PUBLICATIONS

"Database WPI Week 197726", Derwent Publications Ltd., London, GB; AN 1977-46164Y XP002425483 & JP 52 061192 A.

(Continued)

*Primary Examiner* — Tom Duong
(74) *Attorney, Agent, or Firm* — Melanie L. Brown

(57) ABSTRACT

The present invention is directed to an exhaust gas treatment system and method for removing particulate matter and nitrogen oxides from diesel engine exhaust streams. More specifically, the present invention relates to an emission treatment system that effectively provides simultaneous treatment of the particulate matter, as well as the NOx and other gaseous components of diesel engine exhaust. The emission treatment system uses an integrated soot filter coated with a catalyst washcoat composition comprising sub-micron particles, thereby providing an ultra-thin sub-micron washcoat layer showing improved catalyst performance without causing excessive backpressure.

22 Claims, 6 Drawing Sheets

U.S. PATENT DOCUMENTS

| | | |
|---|---|---|
| 5,874,684 A | 2/1999 | Parker et al. |
| 5,898,014 A | 4/1999 | Wu et al. |
| 5,948,723 A | 9/1999 | Sung |
| 6,235,254 B1 | 5/2001 | Murphy et al. |
| 6,274,107 B1 | 8/2001 | Yavuz et al. |
| 6,423,293 B1 | 7/2002 | Chun et al. |
| 6,517,899 B1 | 2/2003 | Hoke et al. |
| 6,818,254 B1 | 11/2004 | Hoke et al. |
| 6,863,984 B2 | 3/2005 | Hoke et al. |
| 7,229,597 B2 | 6/2007 | Patchett et al. |
| 7,306,771 B2 | 12/2007 | Okawara |
| 2001/0043896 A1 | 11/2001 | Domesle et al. |
| 2002/0028169 A1 | 3/2002 | Puppe et al. |
| 2002/0034466 A1 | 3/2002 | Konig et al. |
| 2002/0053202 A1 | 5/2002 | Akama et al. |
| 2002/0114751 A1 | 8/2002 | Puppe et al. |
| 2003/0108465 A1 | 6/2003 | Voss et al. |
| 2003/0115859 A1* | 6/2003 | Deeba .......................... 60/297 |
| 2003/0202926 A1 | 10/2003 | Puppe et al. |
| 2004/0067184 A1 | 4/2004 | Konig et al. |
| 2004/0216451 A1 | 11/2004 | LaBarge et al. |
| 2005/0031514 A1 | 2/2005 | Patchett et al. |
| 2005/0037147 A1 | 2/2005 | Ogunwumi et al. |
| 2005/0044845 A1 | 3/2005 | Onodera et al. |
| 2005/0049144 A1 | 3/2005 | Cai et al. |
| 2005/0129601 A1 | 6/2005 | Li et al. |
| 2005/0164139 A1 | 7/2005 | Valentine et al. |
| 2007/0140928 A1 | 6/2007 | Beall et al. |
| 2007/0264486 A1 | 11/2007 | Verdier |
| 2008/0125316 A1 | 5/2008 | Noda et al. |

FOREIGN PATENT DOCUMENTS

| | | |
|---|---|---|
| DE | 4226111 | 10/1994 |
| DE | 4226112 | 10/1994 |
| DE | 102005021658 | 1/2006 |
| DE | 102004040548 | 2/2006 |
| DE | 102004040550 | 2/2006 |
| EP | 0 499 931 | 2/1992 |
| EP | 0766993 | 4/1997 |
| EP | 1398081 | 3/2004 |
| JP | 02-230538 | 12/1990 |
| JP | 11-021275 | 1/1999 |
| JP | 2004-058013 | 2/2004 |
| JP | 2005262144 | 9/2005 |
| JP | 2007021409 | 2/2007 |
| WO | WO 94/01926 | 7/1993 |
| WO | WO 94/22564 | 2/1994 |
| WO | WO-2005/016497 | 2/2005 |
| WO | WO-2007026844 | 3/2007 |

OTHER PUBLICATIONS

""PCT International Search Report, Apr. 2, 2007", International Appl. No. PCT/US06/43574".

U.S. Appl. No. 11/676,798, filed Feb. 20, 2007.

U.S. Appl. No. 12/028,300, filed Feb. 8, 2008.

U.S. Appl. No. 12/420,895, filed Apr. 9, 2009.

U.S. Appl. No. 12,022,338, filed Jan. 30, 2008.

* cited by examiner

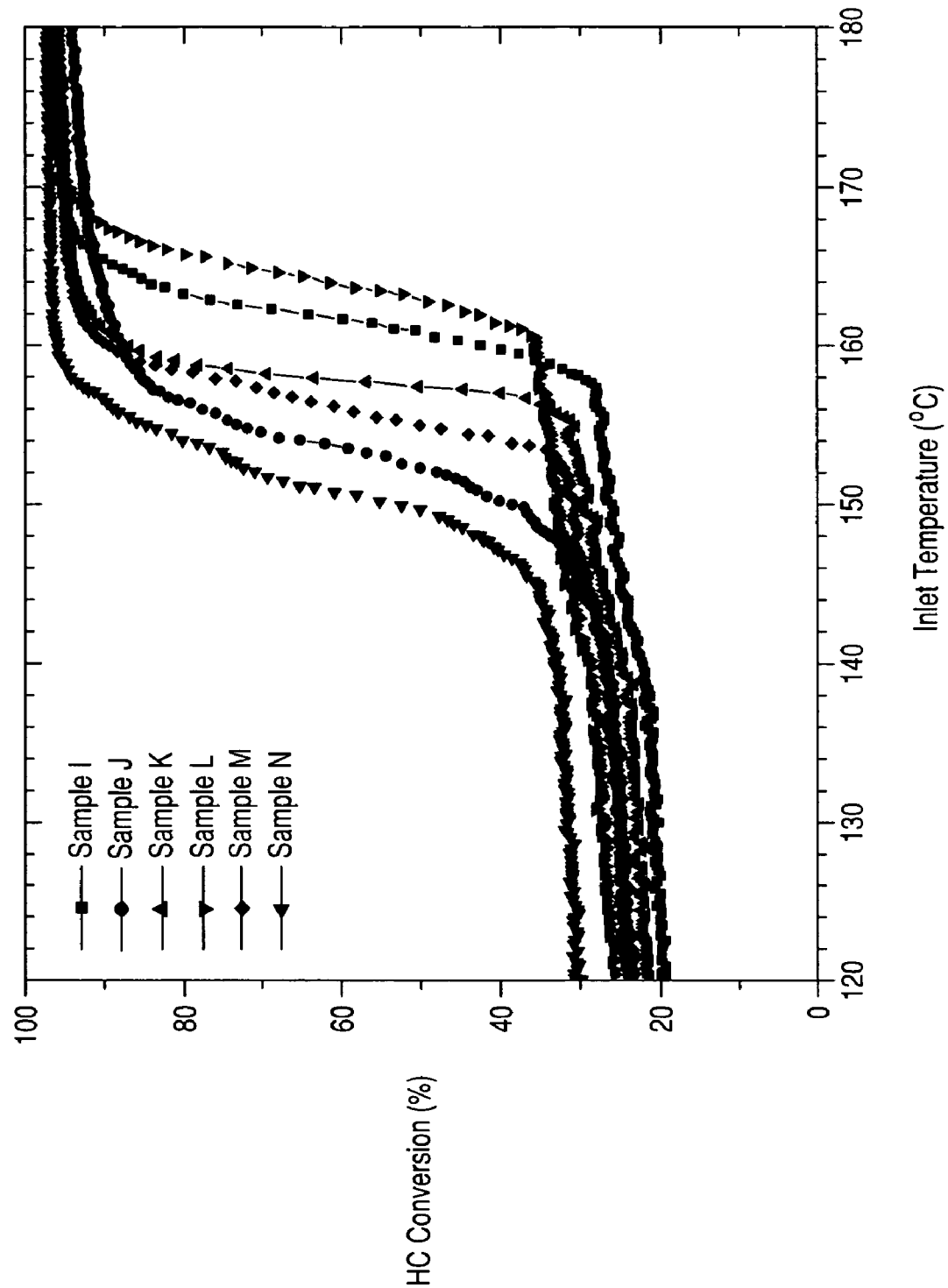

DIESEL PARTICULATE FILTERS HAVING ULTRA-THIN CATALYZED OXIDATION COATINGS

FIELD OF THE INVENTION

The present invention is directed to an exhaust treatment system and method for removing pollutants from a diesel engine exhaust gas stream. More particularly, the present invention relates to an exhaust treatment system and method for removing particulate matter, carbon monoxide, hydrocarbons and nitrogen oxides from diesel engine exhaust gas streams.

BACKGROUND OF THE INVENTION

Compression ignition diesel engines have great utility and advantage as vehicle power plants because of their inherent high thermal efficiency (i.e. good fuel economy) and high torque at low speed. Diesel engines run at a high A/F (air to fuel) ratio under very lean fuel conditions. Because of this, diesel engines have very low emissions of gas phase hydrocarbons and carbon monoxide. However, diesel exhaust is characterized by relatively high emissions of nitrogen oxides (NOx) and particulates. The particulate missions, which are measured as condensed material at 52° C., are multi-phase being comprised of solid (insoluble) carbon soot particles, liquid hydrocarbons in the form of lube oil and unburned fuel, the so called soluble organic fraction (SOF), and the so called "sulfate" in the form of $SO_3 + H_2O = H_2SO_4$.

From the standpoint of emissions, however, diesel engines present problems more severe than their spark-ignition counterparts. Emission problems relate to particulate matter (PM), nitrogen oxides (NOx), unburned hydrocarbons (HC) and carbon monoxide (CO). NOx is a term used to describe various chemical species of nitrogen oxides, including nitrogen monoxide (NO) and nitrogen dioxide ($NO_2$), among others. NO is of concern because it is believed to undergo a process known as photo-chemical smog formation, through a series of reactions in the presence of sunlight and hydrocarbons, and is significant contributor to acid rain. $NO_2$ on the other hand has a high potential as an oxidant and is a strong lung irritant. Particulates (PM) are also connected to respiratory problems. As engine operation modifications are made to reduce particulates and unburned hydrocarbons on diesel engines, the $NO_2$ emissions tend to increase.

The two major components of particulate matter are the volatile organic fraction (VOF) and a soot fraction (soot). The VOF condenses on the soot in layers, and is derived from the diesel fuel and oil. The VOF can exist in diesel exhaust either as a vapor or as an aerosol (fine droplets of liquid condensate) depending on the temperature of the exhaust gas. Soot is predominately composed of particles of carbon. The particulate matter from diesel exhaust is highly respirable due to its fine particle size, which poses health risks at higher exposure levels. Moreover, the VOF contains polycyclic aromatic hydrocarbons, some of which are suspected carcinogens.

Oxidation catalysts that contain platinum group metals, base metals and combinations thereof are known to facilitate the treatment of diesel engine exhaust by promoting the conversion of both HC and CO gaseous pollutants and some proportion of the particulate matter through oxidation of these pollutants to carbon dioxide and water. Such catalysts have generally been contained in units called diesel oxidation catalysts (DOCs), which are placed in the exhaust of diesel engines to treat the exhaust before it vents to the atmosphere. In addition to the conversions of gaseous HC, CO and particulate matter, oxidation catalysts that contain platinum group metals (which are typically dispersed on a refractory oxide support) promote the oxidation of nitric oxide (NO) to $NO_2$.

The soot, on the other hand, is conventionally reduced by the incorporation of a soot filter in the diesel engine exhaust system. The soot filter is composed of wire mesh, or more commonly a porous ceramic structure. As the soot is trapped in the filter, however, back pressure in the exhaust system increases. One strategy for relieving this backpressure is to combust the soot deposited on the filter, thus unclogging the filter. Some soot filters incorporate catalysts specifically for the combustion of the soot (soot combustion catalysts). The temperatures at which soot combusts with air (containing $O_2$), however, is in excess of 500° C., which may be damaging to the soot filter depending on the accumulated soot.

A filter known in the art for trapping particulate matter is a wall-flow filter. Such wall-flow filters can comprise catalysts on the filter and burn off filtered particulate matter. A common construction is a multi-channel honeycomb structure having the ends of alternate channels on the upstream and downstream sides of the honeycomb structure plugged. This results in checkerboard type pattern on either end. Channels plugged on the upstream or inlet end are opened on the downstream or outlet end. This permits the gas to enter the open upstream channels, flow through the porous walls and exit through the channels having open downstream ends. The gas to be treated passes into the catalytic structure through the open upstream end of a channel and is prevented from exiting by the plugged downstream end of the same channel. The gas pressure forces the gas through the porous structural walls into channels closed at the upstream end and opened at the downstream end. Such structures are primarily known to filter particles out of the exhaust gas stream. Often the structures have catalysts on the substrate, which enhance the oxidation of the particles. Typical patents disclosing such catalytic structures include U.S. Pat. Nos. 3,904,551; 4,329,162; 4,340,403; 4,364,760; 4,403,008; 4,519,820; 4,559,193; and 4,563,414.

Oxidation catalysts comprising a platinum group metal dispersed on a refractory metal oxide support are known for use in treating the exhaust of diesel engines in order to convert both HC and CO gaseous pollutants and particulates, i.e., soot particles, by catalyzing the oxidation of these pollutants to carbon dioxide and water.

U.S. Pat. No. 4,510,265 describes a self-cleaning diesel exhaust particulate filter, which contains a catalyst mixture of a platinum group metal and silver vanadate, the presence of which is disclosed to lower the temperature at which ignition and incineration of the particulate matter is initiated. Filters are disclosed to include thin porous walled honeycombs (monoliths) or foamed structures through which the exhaust gases pass with a minimum pressure drop. Useful filters are disclosed to be made from ceramics, generally crystalline, glass ceramics, glasses, metals, cements, resins or organic polymers, papers, textile fabrics and combinations thereof.

U.S. Pat. No. 5,100,632 also describes a catalyzed diesel exhaust particulate filter and a method of removing deposits from the exhaust gas of a diesel engine. The method involves passing the exhaust gases through a catalyzed filter having porous walls where the walls have thereon as a catalyst a mixture of a platinum group metal and an alkaline earth metal. The catalyst mixture is described as serving to lower the temperature at which ignition of collected particulate matter is initiated.

U.S. Pat. No. 4,902,487 is directed to a process wherein diesel exhaust gas is passed through a filter to remove particulate therefrom before discharge. Particulate deposited on the filter is combusted. According to the disclosure the particulate is combusted with a gas containing $NO_2$. It is disclosed that the $NO_2$ is catalytically generated in the exhaust gas before it is passed downstream to the filter on which diesel particulate is entrapped. The $NO_2$ oxidant serves to effectively combust the collected particulate at low temperature and thus reduce the back pressure normally caused by particulate disposition on the filter. It is disclosed that, there should be enough $NO_2$ in the gas fed to the filter to effectively combust the deposited carbon soot and like particulates. Catalysts known to form $NO_2$ from NO are disclosed to be useful. Such catalysts are disclosed to include platinum group metals such as Pt, Pd, Ru, Rh or combinations thereof, and platinum group metal oxides. The downstream filter can be any conventional filter. In a specific embodiment, a ceramic honeycomb monolith is coated with an alumina washcoat carrying a Pt catalyst. A particulate filter is downstream of the monolith. Carbonaceous particulate is disclosed to be combusted at a temperature generally in the order of 375° C. to 500° C. EPO 835 684 A2 discloses a system wherein the upstream catalyst is followed by a downstream catalyzed flow-through monolith. Although U.S. Pat. No. 4,902,487 discloses benefits to making $NO_2$, U.S. Pat. No. 5,157,007 teaches suppressing $NO_2$ due to the fact that the toxicity of $NO_2$ exceeds that of NO.

U.S. Pat. No. 4,714,694 discloses alumina stabilized ceria catalyst compositions. There is disclosed a method of making a material which includes impregnating bulk ceria or a bulk ceria precursor with an aluminum compound and calcining the impregnated ceria to provide an aluminum stabilized ceria. The composition further comprises one or more platinum group catalytic components dispersed thereon. The use of bulk ceria as a catalyst support for platinum group metal catalysts other than rhodium, is also disclosed in U.S. Pat. No. 4,727,052 of C. Z. Wan, et al. and in U.S. Pat. No. 4,708,946 of Ohata, et al.

U.S. Pat. No. 5,597,771 discloses the use of ceria in catalyst compositions both in bulk form, as a particulate material, and in intimate contact with the various components of the catalyst composition. The intimate contact can be accomplished by combining a ceria containing component with at least some of the other components as a soluble cerium salt. Upon application of heat, such as by calcining the cerium salt becomes ceria.

U.S. Pat. Nos. 4,624,940 and 5,057,483 refer to ceria-zirconia containing particles. It is found that ceria can be dispersed homogeneously throughout the zirconia matrix up to 30 weight percent of the total weight of the ceria-zirconia composite to form a solid solution. A co-formed (e.g., co-precipitated) ceria oxide-zirconia particulate composite can enhance the ceria utility in particles containing ceria-zirconia mixture. The ceria provides the zirconia stabilization and also acts as an oxygen storage component. The '483 patent discloses that neodymium and/or yttrium can be added to the ceria-zirconia composite to modify the resultant oxide properties as desired.

U.S. Pat. No. 5,491,120 discloses oxidation catalysts containing ceria and a bulk second metal oxide which may be one or more of titania, zirconia, ceria-zirconia, silica, alumina-silica and alpha-alumina.

U.S. Pat. No. 5,627,124 discloses oxidation catalysts containing ceria and alumina. It is disclosed that each have a surface area of at least about 10 $m^2/g$. The weight ratio of ceria to alumina is disclosed to be 1.5:1 to 1:1.5. It is further disclosed to optionally include platinum. The alumina is disclosed to preferably be activated alumina. U.S. Pat. No. 5,491,120 discloses oxidation catalysts containing ceria and a bulk second metal oxide, which may be one or more of titania, zirconia, ceria-zirconia, silica, alumina-silica and alpha-alumina.

The prior art also shows an awareness of the use of zeolites, including acidic zeolites and metal-doped zeolites, to treat diesel exhaust. European Patent 0 499 931 B 1 is directed to the use of a catalyst for reducing the quantity and/or size of particles and exhaust gases of diesel engines. This catalyst is characterized in using zeolites such as faujasite, pentasil or mordenite with acidic properties to crack to long chain and aromatic hydrocarbons. This patent claims priority from German Patent DE 4105534C2, which discloses the use of acidic zeolites to crack long chain hydrocarbons. Additionally, DE 4226111A1 and DE 4226112A1 are patents which also disclose the use of acidic zeolites. In DE 4226111A1, noble metal and acid zeolites are disclosed as a composition to catalyze the reduction of mass and/or size of particles. DE 4226112A1 discloses compositions using transitional metal oxide and an acid zeolite for similar reasons. U.S. Pat. No. 5,330,945 discloses a catalyst treatment of diesel exhaust particles. Such a composition is includes a zeolite having exchangeable cations at cationic sites in combination with silica and very fine particles of catalytic metal. The goal, here again, is to permit penetration of hydrocarbons to be cracked and oxidized.

WO 94/22564 discloses a catalyst composition for treating diesel exhaust which includes ceria and optionally alumina as well as a Beta zeolite. A platinum group metal is employed to promote oxidation of CO and HC while limiting the conversion of $SO_2$ to $SO_3$.

WO 94/01926 entitled, "Improved Zeolite-Containing Oxidation Catalyst and Method of Use" discloses catalyst compositions for treating a diesel engine exhaust stream containing a volatile organic fraction. A catalyst composition comprises a refractory carrier on which is disposed a coating of a catalytic material comprising a catalytically effective amount of ceria having a BET surface area of at least about 10 $m^2/g$ and a catalytically effective amount of a zeolite. It is also known to employ ceria and alumina as a support for a platinum group metal as a dual exhaust catalyst. The zeolite can be doped with a platinum group metal. In this composition the zeolite is employed to serve both to catalyze the oxidation of VOF and to crack the larger VOF molecules and, during period of relatively low temperature operation, to trap gas-phase hydrocarbons within the zeolite pores. If the zeolite has been doped with one or more catalytic metals or hydrogen, the trapped gas-phase hydrocarbons are brought into intimate contact with the catalytically active cations, which facilitates oxidation of the hydrocarbons.

To reach ever higher standards of emission control, original equipment manufacturers (OEMs) typically use one or more diesel oxidation catalysts (DOC) in front of a catalyzed soot filter (CSF) to bring vehicles into compliance. Specifically, DOCs in a close-coupled (CC) position to rapidly light-off (burn) the filtered particulate matter have been used. This is a very costly approach. Many OEMs have suggested CC CSFs alone or in combination with a very thin slice of a DOC to help meet emissions standards and reduce costs. However, to apply this approach the CSF must have the full catalytic capabilities of a DOC.

Typically, low porosity wall-flow substrates for use as CSFs limit washcoat layers to below 0.5 $g/in^3$ due to back-pressure constraints. Higher porosity (>50%) substrates can be used to carry increased washcoat loadings necessary for the CSF to have the full catalytic capabilities of a DOC. However, these higher porosity substrates are difficult and costly to produce and are still limited by the amount of traditional washcoat (typically 1 g/in$^3$) that can be applied and still meet backpressure requirements. When one considers that sufficient DOC catalyst washcoats can exceed 2 g/in$^3$, it becomes apparent that there is a dichotomy between the level of washcoating needed to provide sufficient DOC performance and backpressure constraints. Therefore, it is an object of the present invention to provide a washcoat layer, which when applied to a catalyzed soot filter in sufficient quantity to provide the catalytic capabilities of a diesel oxidation catalyst will not cause excessive back pressure across the coated article when implemented in an emission treatment system.

SUMMARY OF THE INVENTION

The present invention is directed to an exhaust gas treatment system and method for removing particulate matter, carbon monoxide, hydrocarbons and nitrogen oxides from diesel engine exhaust streams. More particularly, the present invention is directed to an exhaust gas treatment system for a diesel engine comprising a catalyst coated soot filter or catalyzed soot filter (CSF). The catalyzed soot filter further comprises a substrate, e.g., a wall-flow monolith, coated with an ultra-thin washcoat composition comprising sub-micron particles. Optionally, a diesel oxidation catalyst (DOC) can be used in conjunction with the catalyzed soot filter of the present invention.

In one embodiment, one or more ultra-thin washcoat composition comprising sub-micron particles may be coated over one another. In another embodiment, the catalyzed soot filter of the present invention can be zone coated with different catalysts and/or differing catalyst concentrations.

BRIEF DESCRIPTION OF THE DRAWINGS

FIG. 7 shows a comparison of hydrocarbon conversion at various temperatures across a wall-flow substrate coated with various catalyst washcoats.

DETAILED DESCRIPTION OF THE INVENTION

The carbonaceous particulates ("soot") component of diesel engine exhaust is, as discussed above, known to be comprised of relatively dry carbonaceous particulates and a volatile organic fraction ("VOF") comprising high molecular weight hydrocarbons, typically greater than $C_9$ and usually ranging from $C_{12}$-$C_{50}$ resulting from unburned and partially burned diesel fuel and lubricating oil. The VOF is present in the diesel exhaust as either a vapor phase or a liquid phase, or both, depending on the temperature of the exhaust.

In order to reduce the total particulates discharged, the volatile organic fraction, or at least a portion thereof, must be oxidized to innocuous $CO_2$ and $H_2O$ by being contacted with an oxidation catalyst under suitable reaction conditions. The gaseous pollutants, including HC, CO and NOx can be catalytically treated. The gaseous hydrocarbons (typically $C_2$ to $C_6$ containing hydrocarbons) can be oxidized to $CO_2$ and $H_2O$, and the nitrogen oxides reduced to form nitrogen ($N_2$).

In accordance with the present invention, integration of a soot filter (for particulate removal) and an oxidation catalyst (for the burning of soot, and abatement of NOx and other diesel engine gases) into a single catalyst article can be accomplished, for example, using a wall-flow substrate coated with an ultra-thin washcoat composition comprising sub-micron particles. Moreover, the ultra-thin sub-micron washcoat composition, described herein, allows a wall-flow substrate to be loaded with practical levels of a catalyst without causing excessive backpressure across the coated article when implemented in an emission treatment system.

It has been found that by using a washcoat composition or catalyst washcoat composition comprising sub-micron washcoat particles (SWP) and/or sub-micron catalyzed coating particles (SCCP), it is possible to coat a substrate without significantly impacting the backpressure of the filter. As used herein, "sub-micron washcoat particles (SWP)" can include any known washcoat particles, for example, washcoat support particles including but not limited to base metal oxides such as alumina and zirconia, wherein the particles are sub-micron in size. Additional base metal oxides are described hereinbelow. "Sub-micron catalyzed coating particles (SCCP)" can include any known catalyst particle, for example, a co-formed ceria-zirconia composite, or one or more platinum group metals and washcoat support particles impregnated with one or more platinum group metals, wherein the catalyst particles are sub-micron is size." In the practice of the present invention, the sub-micron washcoat particles and/or sub-micron catalyzed coating particles, collectively known herein as "sub-micron particles," can be added to a washcoat slurry during preparation of the slurry and subsequently coated to a substrate, as described herein below.

Figure 4:
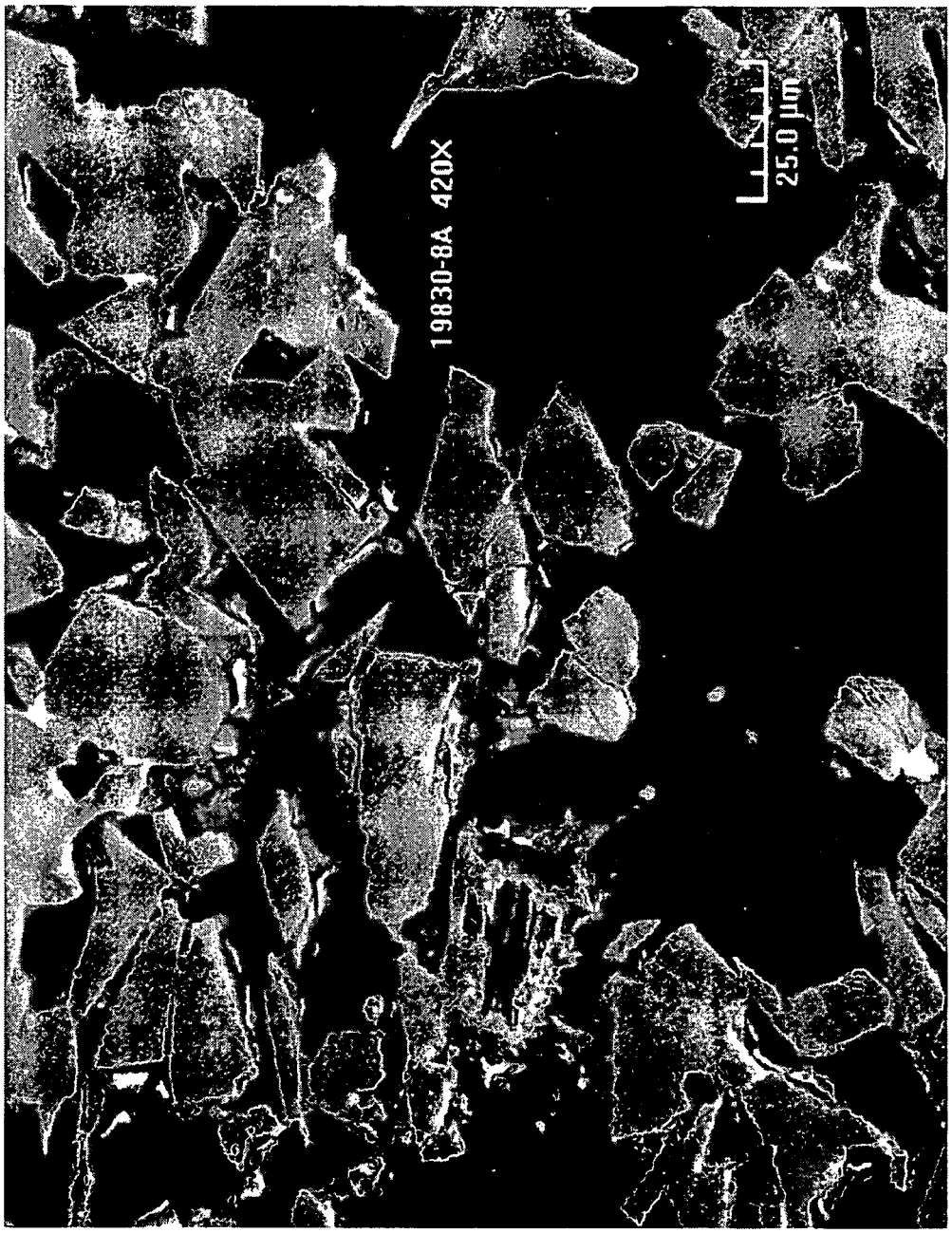
FIG. 4 shows a scanning electron micrograph of a sub-micron coated filter substrate.

The sub-micron washcoat composition of the present invention is an ultra-thin and uniform coating across both the channels and internal structure of the soot filter, e.g., a wall-flow monolith. The sub-micron catalyst particles in an aqueous washcoat can flow through the substrate wall and deposit uniformly across all the internal geometric areas of the soot filter. Conventional particles, in contrast, which are typically greater than 1 micron, are picked-up at the wall interface and in larger pores and tend to clump into dead end pores or channels within the wall. Traditional micron sized particle coatings tend to form clusters or agglomerates within the wall of the substrate or on the wall of the channel. Conversely, the sub-micron coating is highly dispersed on the interior of the wall structure (see FIG. 4). This very thin highly dispersed coating results in a minimal increase in backpressure compared to the traditional micron catalytic coating.

The present invention uses a washcoat composition comprising sub-micron particles to obtain continuous catalytic coatings within the internal structure of a ceramic wall-flow filter, for the purpose of collecting and burning soot, and for the removal of gas phase reaction products from the exhaust of a diesel engine. The sub-micron particles of the present invention are typically less than 1 micron in size, and preferably from about 0.01 to about 0.5 microns. The resulting catalytic washcoat layer is a uniform, thin and continuous coating, thereby having a minimal impact on backpressure of the exhaust flow. High backpressure negatively impacts both vehicle performance and fuel economy. A uniform continuous coating throughout the structure of the porous ceramic wall also provides good contacting of the reactants with the catalytic compounds. Conversely, coatings derived from micron-sized particles tend to deposit near the walls or within dead end channels within the wall structure.

In another embodiment, one or more washcoat compositions each comprising sub-micron particles can be coated to a substrate, e.g., a wall-flow filter, for the purpose of collecting and burning soot, and for the removal of gas phase reaction products from the exhaust of a diesel engine. In this embodiment, the washcoat layers can be coated as contiguous layers one over top of the other. This type of washcoat layering is not possible with conventional micron sized particle washcoats because micron sized particles can be caught on the channel walls and within the pores of the filter leading to particle segregation. Optionally, the washcoat layers may contain similar or different sub-micron particles, e.g., the washcoat layers may contain different sub-micron washcoat particles and/or sub-micron catalyzed coating particles for different functions.

Methods of preparing sub-micron sized particles are known in the art. Such particles have been produced in a particle size range of from about 10 to 500 nanometers (0.01 to 0.5 microns) for use in the making of catalysts, superconductors, and oxides. See, for example, U.S. Pat. Nos. 5,417,956; 5,460,701; 5,466,646; 5,514,349; and 5,874,684; which are incorporated herein by reference.

The ultra-thin sub-micron coated catalyzed soot filter of the present invention, when employed in a diesel exhaust treatment system, is effective for effectuating a reduction in total soot particulates, and is also capable especially with the addition of a platinum group metal component and/or other catalytic metals as described below, of providing the added advantage of oxidizing a portion of the HC and CO and reducing a portion of the NOx contained in the gaseous component of the diesel engine exhaust. The sub-micron catalyst compositions are especially useful in regenerating soot filters in diesel exhaust systems during periods when the exhaust is cool, e.g., below 200° C., such as when diesel engines are operated at low load, or at start up.

In accordance with the present invention, a soot filter is coated with a catalyst washcoat composition comprising sub-micron particles, which is effective for the combustion of particulate, and gaseous pollutants (e.g., unburned gaseous hydrocarbons, carbon monoxide). The catalyst washcoat composition can comprise any known catalysts in the art for the burning of soot and for the abatement of exhaust gas pollutants (HC, CO, and NOx). For example, such catalyst compositions may comprise a sub-micron co-formed ceria-zirconia composite, a sub-micron base metal oxide optionally impregnated with a platinum group metal, one or more sub-micron platinum group metals and combinations thereof. The co-formed sub-micron ceria-zirconia composite and the base metal oxide can be formed into discrete layers that are deposited on the substrate (one overlying the other), or the ceria composite and base metal oxide can be used in admixture.

As used herein, the term "co-formed sub-micron ceria-zirconia composite" refers to a bulk material that is a co-formed composite of sub-micron ceria and zirconia (e.g., formed from sub-micron ceria and zirconia oxides available commercially), and optionally can contain other sub-micron rare earth components selected from lanthanum, praseodymium and neodymium. The co-formed sub-micron ceria-zirconia composites can be formed by techniques such as co-gelling, co-precipitation, plasma spraying and the like. Any other suitable technique for preparing the sub-micron ceria-zirconia composite can be used provided that the resultant product contains the sub-micron ceria and zirconia dispersed throughout the matrix of the particle in the finished product. Such techniques are distinguished from those that merely disperse zirconia on the surface of the ceria particles or only within a surface layer, thereby leaving a substantial core of the ceria particle without zirconia dispersed therein. Suitable techniques for forming co-precipitated ceria-zirconia composites are disclosed in U.S. Pat. Nos. 5,057,483 and 5,898,014, and the preparative descriptions disclosed therein are hereby incorporated by reference.

Sub-micron cerium and zirconium salts are also useful for forming the co-formed sub-micron ceria-zirconia composites including sub-micron cerium and zirconium chlorides, sulfates, nitrates, acetates, etc. Where the composites are formed by a co-precipitation technique, the intermediate co-precipitates can, after washing, be spray dried or freeze dried to remove the water and then calcined in air at about 500° C. to form the co-formed ceria-zirconia composites. The co-formed ceria-zirconia composites have a surface area of at least 10 $m^2/g$ and preferably at least 20 $m^2/g$. In co-formed sub-micron ceria-zirconia composites that contain only ceria and zirconia, the proportion of ceria in the co-formed sub-micron ceria-zirconia composite is generally from 20 wt % to 95 wt %, and more preferably from 40 to 80 wt %. The proportion of zirconia is typically from 10 wt % to 60 wt %, and preferably from 10 wt % to 40 wt % of the co-formed ceria-zirconia composite.

Co-formed sub-micron ceria-zirconia composite can optionally contain additional sub-micron rare earth metal elements selected from one or more of lanthanum, praseodymium and neodymium components. Sub-micron rare earth metal oxides other than ceria generally form from 10 to 60 wt % of the co-formed sub-micron ceria-zirconia composite composition. A preferred co-formed sub-micron ceria-zirconia composite contains sub-micron praseodymia in addition to sub-micron ceria and zirconia. Such a composite is particularly effective at lowering the temperatures at which the particulate, and in particular the soot fraction, combusts. The incorporation of these co-formed sub-micron ceria-zirconia composites (containing praseodymia) is beneficial in regenerating soot filters containing deposited particulate. While not being bound by theory, applicants believe that the praseodymia contributes to the enhanced catalytic effect of the co-formed composite due to the relative ease with which praseodymia transfers activated oxygen to the trapped carbonaceous component that comprises the soot fraction, over other rare earth metal oxides. For co-formed sub-micron ceria-zirconia composites that contain praseodymium, there is generally from 30 to 95 wt % ceria, from 5 to 40 wt % zirconia, and from 10 to 60 wt % praseodymia in the composite. Preferably, such co-formed composites contain from 40 to 80 wt % ceria, from 5 to 25 wt % zirconia and from 20 to 40 wt % praseodymia.

As described above, preferred co-formed sub-micron ceria-zirconia composites that contain praseodymia are preferably formed by techniques such as co-gelling and co-precipitation of soluble salts of mixtures of cerium, praseodymium and zirconium. It is preferred that all three components are mixed by the above-mentioned techniques so that all three components are dispersed uniformly throughout the composite matrix; however, it is also possible but less preferable to impregnate a co-formed sub-micron ceria-zirconia composite with a solution of a soluble salt of sub-micron praseodymium, e.g., sub-micron praseodymium nitrate, to load the praseodymium component. Impregnation of a preformed ceria-zirconia composite is disclosed in U.S. Pat. No. 6,423,293, which is incorporated by reference herein.

The sub-micron washcoat composition of the present invention may also include a sub-micron base metal oxide. While not wishing to be bound by theory, it is believed that the base metal oxides improve the adherence of the catalyst washcoat onto the filter substrates and provide binding action to the washcoat so that it is internally cohesive. Base metal oxides may also provide an open washcoat morphology that improves gas phase diffusion. In some embodiments, the base metal oxides also serve as a catalyst support for platinum group metals.

Preferred sub-micron base metal oxides are one or more of alumina, zirconia, silica, titania, silica-alumina, magnesium oxide, hafnium oxide, lanthanum oxide, yttrium oxide and combinations thereof. The base metal oxides are typically used in bulk form and generally have a surface area of at least 10 $m^2/g$, and preferably have a surface area of at least 20 $m^2/g$. A preferred sub-micron base metal oxide is alumina (commercially available).

The sub-micron base metal oxides are generally used in an amount from 10 to 99 wt % of the catalyst composition. Preferably the base metal oxides are incorporated into the catalyst compositions at concentrations of from 20 to 95 wt %. More preferably, the catalyst compositions contain a concentration of base metal oxides of from 40 to 90 wt %. For example, a sub-micron catalyst composition deposited on a soot filter can contain 50 wt % of sub-micron base metal oxide in combination with 50 wt % of co-formed sub-micron ceria-zirconia composite.

In some embodiments, it may be preferable to include a washcoat binder such as hydrated forms of alumina, e.g., pseudoboehmite, to improve the adherence of the catalyst composition on the filter substrate. Other binders that are useful in the invention include binders formed from silica, silica-alumina and zirconia. For purposes of this application, such binders are considered to be part of the base metal oxide component of the catalyst washcoat.

In some embodiments, it may be preferable to include one or more sub-micron platinum group metal components in the catalyst composition. Useful platinum group metals include platinum, palladium, rhodium and combinations thereof. The inclusion of the platinum group metal is useful for catalyzing the combustion of gaseous components such as unburned hydrocarbons and carbon monoxide to innocuous emissions. In addition, the inclusion of one or more platinum group metals is also useful for generating nitrous oxide ($NO_2$) from nitric oxide (NO) to assist in the combustion of the particulate. $NO_2$ is known as a powerful oxidant that is particularly useful for catalyzing the particulate deposited on the soot filter at lower exhaust temperatures than would be possible with other oxidants such as molecular oxygen. The platinum group metals can burn injected hydrocarbons on the filter to raise the localized temperature between the soot and the catalyst to accelerate the burning of soot.

The sub-micron platinum group metal components can be dispersed in the catalyst washcoat composition by deposition on other washcoat particles, e.g., on the co-formed sub-micron ceria-zirconia composite, on particles of the sub-micron base metal oxide, or both, using solutions of water-soluble salts or complexes of platinum group metals (also referred to as "platinum group metal precursors"). Typically, an impregnation procedure is used to achieve the dispersion of the platinum group metals onto the particles of the sub-micron ceria composite and/or the sub-micron base metal oxide component. For example, potassium platinum chloride, ammonium platinum thiocyanate, amine-solubilized platinum hydroxide, chloroplatinic acid, palladium nitrate and palladium chloride are platinum group metal precursors that can be used to achieve the impregnation of the particles of the co-formed ceria-zirconia composite and/or the base metal oxide component. Upon calcination of the catalyst compositions, the platinum group metal precursors are converted to the catalytically active metal or its oxide. The impregnation of the platinum group metal components on the co-formed sub-micron ceria-zirconia composite and/or sub-micron base metal oxide can be conducted after coating the catalyst composition on the substrate; however, the impregnation is preferably conducted prior to coating the catalyst composition.

In embodiments where platinum group metals are incorporated into the catalyst composition, there is generally from 0.1 to 200 $g/ft^3$ of the platinum group metal in the final calcined filter substrate. Since the exhaust articles of the invention can be used without the requirement of incorporating an upstream diesel oxidation catalyst that is incorporated with a wall-flow substrate, sufficient concentrations of platinum group metal components are preferably deposited on the filter substrates to convert the gaseous components of the exhaust (gaseous unburned hydrocarbons and carbon monoxide) to innocuous products. In addition, as described above, it is desirable to produce sufficient $NO_2$ from NO in the exhaust to lower the combustion temperature of the particulate, particularly the soot fraction. Preferably there is from 10 to 100 $g/ft^3$, and more preferably 20 to 80 $g/ft^3$ of platinum group metal in the catalyst composition. Preferably, the platinum group metal includes one or more of platinum, palladium, rhodium or combinations thereof.

Lower concentrations of platinum group metals (e.g., 0.1 to 10 $g/ft^3$) can be used in instances where it is desirable to minimize the formation of sulfate components in the particulate. For instance with diesel fuels that contain higher sulfur levels (not ultra low diesel fuel), it is desirable to minimize the oxidation of sulfur to $SO_3$ so as to reduce the formation of sulfuric acid.

In an optional embodiment, the coating process can be manipulated such that the amount of platinum group metals applied to the wall-flow substrate in the sub-micron catalyst composition vary over the length of the substrate. In this embodiment, one or more platinum group metals can be applied to the sub-micron coated substrate, while varying the concentration of the platinum group metals from the upstream portion to the downstream portion of the substrate. For example, the upstream portion of the substrate can contain lower levels of platinum group metals (i.e., 0.1 to 10 $g/ft^3$) to minimize deleterious effects of $SO_3$ on downstream catalysts. As used herein and in the appended claims, the terms "upstream" and "downstream" refer to relative directions according to the flow of an exhaust gas stream.

In another optional embodiment, adsorption compositions can also be included to adsorb pollutants such as hydrocarbons and nitrogen oxides for subsequent removal. In this embodiment, sub-micron adsorption compositions can be added to the sub-micron catalyst washcoat composition or can be coated as a separate washcoat layer. Useful and preferred adsorption compositions include zeolites, other molecular sieves and Group IIA alkaline earth metal oxides such as barium oxide. Hydrocarbons and particulate matter can be adsorbed from 0° C. to 110° C. and subsequently treated by desorption followed by catalytic reaction or incineration. Useful zeolitic compositions are described in U.S. Pat. No. 6,274,107, hereby incorporated by reference.

The zeolite employed serves both to catalyze the oxidation of VOF and to crack the larger VOF molecules and, during periods of relatively low temperature operation, to trap gas-phase hydrocarbons within the zeolite pores. The zeolite can be optionally doped, e.g., ion-exchanged, with one or more of hydrogen, a platinum group metal or other catalytic metals. Alternatively, or in addition, the zeolite of the catalyst composition may be doped, e.g., ion-exchanged, with a catalytic moiety such as one or more of hydrogen ion, platinum, copper, nickel, cobalt, iron, etc. In one aspect of the present invention, the zeolite comprises a three-dimensional zeolite characterized by pore openings whose smallest cross-sectional dimension is at least about 5 Angstroms and having a silicon to aluminum atomic ratio ("Si:Al atomic ratio") of greater than 5, e.g., a Si:Al atomic ratio of from about 5 to 400. The term "doped" used to refer to a zeolite being doped with a metal or hydrogen, and the terms "dope" or "doping" used in the same context, means that the metal or hydrogen moiety is incorporated within the pores of the zeolite, as distinguished from being dispersed on the surface of the zeolite but not to any significant degree within the pores of the zeolite. Doping of a zeolite is preferably carried out by known ion-exchange techniques in which a zeolite is repeatedly flushed with a solution containing metal cations (or an acid to provide hydrogen ions), or the zeolite pores are flooded with such solution. However, the defined terms include any suitable technique for incorporating a catalytic moiety, e.g., one or more metals as ions or neutral metal-containing species or hydrogen ions, within the pores of the zeolite, especially by exchange or replacement of cations of the zeolite.

In one aspect of this embodiment, the sub-micron catalyst composition comprises the combination of ceria, zeolite and, optionally, alumina, and one or both of the optional doping of the zeolite and dispersal of the catalytic metals, platinum or palladium as part of the composition and in the use thereof to treat diesel exhaust streams.

In another aspect of the invention, the zeolite comprises from about 0 to 60, preferably from about 20 to 50, percent by weight, the alumina comprises from about 99 to 10, preferably from about 95 to 20, percent by weight, and the ceria composite comprises from about 40 to 0, preferably from about 30 to 10, percent by weight, of the combined weight of the zeolite, the alumina and the ceria composite.

As described hereinabove, the exhaust treatment system of the present invention contains a soot filter to trap the particulate matter and prevent the material from venting directly to the atmosphere. Soot filters that are useful in the invention may include open cell foam filters; honeycomb wall-flow filters; wound or packed fiber filters; sintered metal powder filters; sintered metal fiber filters; perforated metal foil filters; ceramic fiber composite filters; or the like. Such soot filters are typically formed from refractory materials, such as ceramics or metals. In the practice of the present invention, the catalyzed filters are typically placed in a canister (also referred to as a housing), which directs the fluid stream to be treated through the canister inlet to the inlet side of the filter. Soot filters useful for the purposes of this invention include structures through which the exhaust stream passes without causing too great an increase of backpressure or pressure drop across the article.

The ceramic substrate may be made of any suitable refractory material, e.g., cordierite, cordierite-alumina, silicon nitride, silicon carbide, acicular mullite, aluminum titanate, zircon mullite, spodumene, alumina-silica magnesia, zircon silicate, sillimanite, a magnesium silicate, zircon, petalite, alumina, alpha-alumina, an aluminosilicate and the like.

The substrates useful for the sub-micron washcoat compositions of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10-25 wt % of chromium, 3-8 wt % of aluminum and up to 20 wt % of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces of the substrate. Such high temperature-induced oxidation may enhance the adherence of the refractory metal oxide support and catalytically promoting metal components to the substrate.

In a preferred embodiment, the soot filter is a wall-flow filter, e.g. a honeycomb wall-flow monolith. The material used to form the wall-flow filter should be relatively inert with respect to the sub-micron catalytic composition dispersed thereon. Wall-flow filters and the sub-micron catalyst washcoat composition deposited thereon are necessarily porous, as the exhaust must pass through the walls of the carrier in order to exit the carrier structure.

Wall-flow filters have a plurality of fine, substantially parallel gas flow passages extending along the longitudinal axis of the filter body. Typically, each passage is blocked at one end of the body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes.

Figure 1:
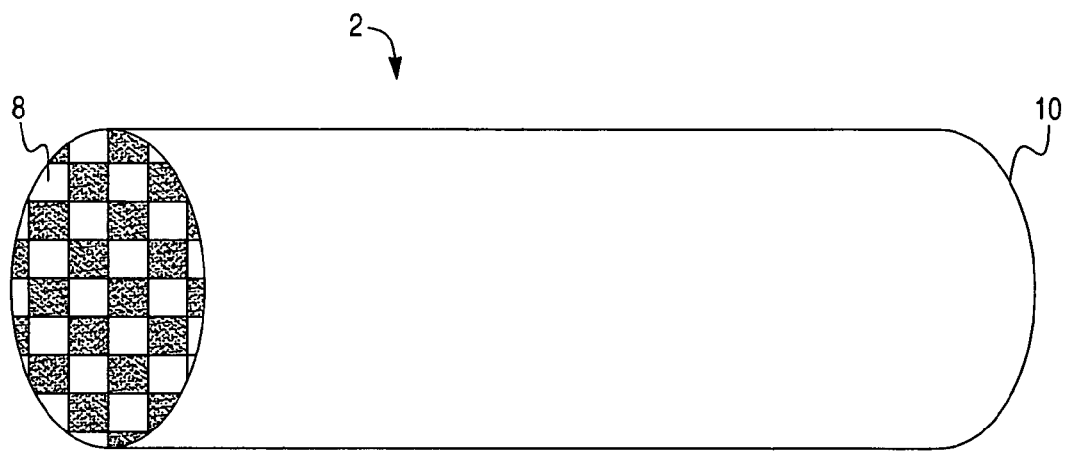
FIG. 1 depicts an enlarged view of flow-through cells of a wall-flow monolithic in accordance with one embodiment of the present invention.
Figure 2:
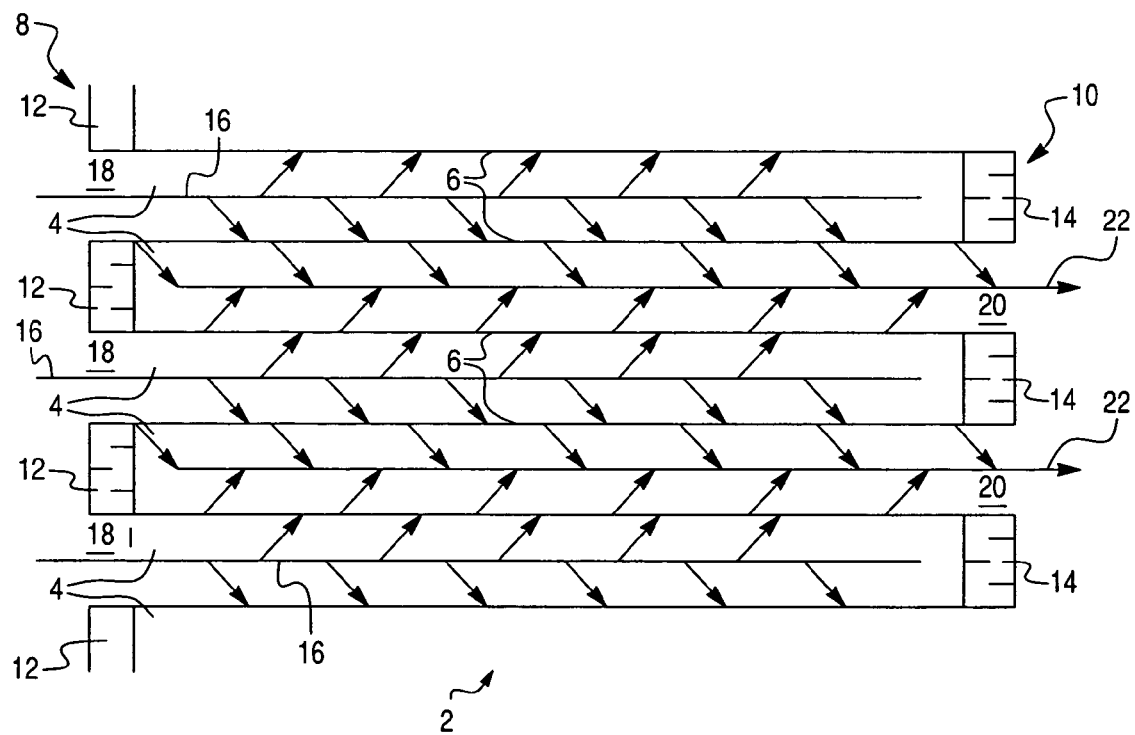
FIG. 2 depicts a longitudinal cross-sectional view of a wall-flow monolith in accordance with one embodiment of the present invention.

FIGS. 1 and 2 illustrate a wall-flow monolith 2, which has a plurality of passages 4, in accordance with one embodiment of the present invention. The passages 4 are tubularly enclosed by the internal walls 6 of the filter 2. The filter 2 has an inlet end 8 and an outlet end 10. Alternate passages are plugged at the inlet end 8 with inlet plugs 12, and at the outlet end 10 with outlet plugs 14 to form opposing checkerboard patterns at the ends of the inlet 8 and outlet 10 ends. A gas stream 16 enters through the unplugged channel inlet 18, and flows through passage 4. The gas flow is stopped by outlet plug 14 and diffuses through the internal walls 6 (which are porous) to the outlet side 20 and exits the monolith as gas stream 22. The gas cannot pass back to the inlet side of walls because of inlet plugs 12.

Preferred wall-flow filters are composed of ceramic-like materials such as cordierite, α-alumina, silicon carbide, silicon nitride, zirconia, mullite, spodumene, alumina-silica-magnesia, zirconium silicate, or of refractory metals such as stainless steel. Preferred wall-flow filters are formed from cordierite and silicon carbide. Such materials are able to withstand the environment, and particularly high temperatures encountered in treating the exhaust gas streams.

As discussed above, preferred wall-flow filters for use in the inventive system include thin porous walled honeycombs (monolith)s through which the fluid stream passes without causing too great an increase in backpressure or pressure across the article. Ceramic wall-flow substrates used in the system are preferably formed of a material having a porosity of from about 30 to about 75%, having a mean pore size of at least 5 microns (e.g., from 5 to 30 microns). More preferred are substrates having wall porosity, typically from about 40 to about 65%. When substrates with these porosities and these mean pore sizes are coated with the techniques described herein, adequate levels of the sub-micron catalyst washcoat composition can be coated onto the substrates to achieve excellent CO, HC and NOx conversion efficiency and allow these substrates to maintain adequate exhaust flow characteristics, i.e., acceptable backpressures. U.S. Pat. No. 4,329,162 is herein incorporated by reference with respect to the disclosure of suitable wall-flow substrates.

The porous wall-flow filter used in this invention is catalyzed in that the wall of said element has thereon or contained therein one or more sub-micron catalyst washcoat compositions, as described herein. The sub-micron catalyst washcoat may be coated on the inlet side of the element wall alone, the outlet side alone, within the pores of the wall itself, or the inlet and outlet sides and within the pores of the wall.

The sub-micron catalyst washcoat composition may be prepared in the form of an aqueous slurry of sub-micron ceria, zirconia, or metal oxide particles, e.g., alumina, etc. The particles can optionally be impregnated with one or more platinum group metals. The slurry can then be applied to the carrier, dried and calcined to form a catalytic material coating ("washcoat") thereon. Typically, the sub-micron catalyst washcoat composition is mixed with water and an acidifier such as acetic, nitric, citric, formic and tartaric acids.

Optionally, to coat the wall-flow substrates with the sub-micron catalyst washcoat composition of the present invention, the substrates are immersed vertically in a portion of the sub-micron catalyst slurry such that the top of the substrate is located just above the surface of the slurry. In this manner slurry contacts the inlet face of each honeycomb wall, but is prevented from contacting the outlet face of each wall. The sample is left in the slurry for about 30 seconds. The substrate is removed from the slurry, and excess slurry is removed from the wall-flow substrate first by allowing it to drain from the channels, then by blowing with compressed air (against the direction of slurry penetration), and then by pulling a vacuum from the direction of slurry penetration. By using this technique, the catalyst slurry permeates the walls of the substrate, yet the pores are not occluded to the extent that undue backpressure will build up in the finished substrate. As used herein, the term "permeate" when used to describe the dispersion of the catalyst slurry on the substrate, means that the catalyst composition is dispersed throughout the wall of the substrate.

The coated substrates are dried typically at about 100° C. and calcined at a higher temperature (e.g., 300 to 450° C.). After calcining, the catalyst loading can be determined through calculation of the coated and uncoated weights of the substrate. As will be apparent to those skilled in the art, the catalyst loading can be modified by altering the solids content of the coating slurry. Alternatively, repeated immersions of the substrate in the coating slurry can be conducted, followed by removal of the excess slurry as described above.

In one embodiment, the exhaust system of the present invention can optionally include a diesel oxidation catalyst (DOC). Oxidation catalysts comprising a platinum group metal dispersed on a refractory metal oxide support are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts, or more simply catalytic converters or catalyzers, which are placed in the exhaust train of diesel power systems to treat the exhaust before it vents to the atmosphere. Typically, the diesel oxidation catalysts are formed on ceramic or metallic carriers (such as the wall-flow monolith carriers described above) upon which catalytic washcoat compositions are deposited. The catalytic washcoats generally contain base metal catalytic agents, platinum group metal catalytic agents or combinations of both that are supported on refractory metal oxides, e.g., activated alumina. Preferred base metal catalytic agents include rare earth metal oxides, particularly lanthanum oxide, cerium oxide and praseodymium oxide. Preferred platinum group metal catalytic agents include platinum, palladium, and rhodium.

Preferably the diesel oxidation catalysts used in the invention include at least one platinum group metal, so that the conversions of NO to $NO_2$ are also catalyzed as described in U.S. Pat. No. 4,902,482. The platinum group metal-catalyzed conversion of NO supplements the levels of $NO_2$ oxidant in the exhaust stream to ensure adequate combustion of the soot deposited on the soot filter downstream. The catalytic washcoat compositions also typically contain other additives such as promoters and stabilizers.

In this embodiment, the DOC catalyst can be placed upstream of the sub-micron coated catalyzed soot filter of the present invention for the oxidation of carbon monoxide and hydrocarbons and reduction of nitrogen oxides contained in exhaust gas streams. In another embodiment, the DOC catalyst can be placed directly upstream of the sub-micron coated catalyzed soot filter and can be contained in the same canister as the sub-micron coated catalyzed soot filter.

In a further embodiment of the present invention, the sub-micron coated catalyzed soot filter is preferably used in the close-coupled position. In this embodiment, the sub-micron coated catalyzed soot filter of the present invention is placed close to the diesel engine to enable it to reach reaction temperatures as soon as possible. The close-coupled catalyst in the catalyst bed is heated to high temperature by heat from both the hot exhaust gas and by heat generated by the combustion of hydrocarbons and carbon monoxide present in the exhaust gas. Therefore, in addition to being very reactive at low temperatures, the close-coupled catalyst composition should be stable at high temperatures during the operating life of the engine.

The close-coupled catalyst of the present invention accomplishes the oxidation of carbon monoxide and hydrocarbons and reduction of nitrogen oxides at low reaction temperatures such as encountered during "cold start" conditions. Such conditions are typically below 200° C. The light-off temperature for a specific component is the temperature at which 50% of that component reacts. The light-off temperatures of the composition of the present invention, and the composite, is as low as possible with useful catalysts having light-off temperatures in the range of 120° C. to 400° C., preferably 120° C. to 350° C., depending on the specific sub-micron catalyst composition being used. The close-coupled catalyst composition should be thermally stable upon exposure to temperature up to 1100° C. and higher during the operating life of the engine. This has been accomplished by increasing thermal stability of the catalyst washcoat, zoning of the washcoat, and by controlling the reaction of carbon monoxide in the close-coupled catalyst bed and therefore reducing temperature rise related to carbon monoxide combustion in the catalyst bed. At the same time, the close-coupled catalyst composition provides a relatively high hydrocarbon conversion. Optionally there can be a catalyst downstream of the close-coupled catalyst. The downstream catalyst can be an underfloor catalyst or a downstream catalyst immediately downstream of the close-coupled catalyst. The downstream catalyst can be a supported catalyst composition adjacent to the close-coupled catalyst on the same substrate or on a separate adjacent substrate.

The present invention is illustrated further by the following examples, which are not intended to limit the scope of this invention.

EXAMPLES

Example 1

Preparation of Sample A

Sample A was prepared by washcoating a 1" diameter×3" long SiC wall-flow substrate (58% porosity, 300 cell/square inch, 12 mil wall thickness). The wall-flow substrate was coated with a washcoat slurry containing 90 g/ft$^3$ Pt, 0.6 g/in$^3$ Siralox® Si/Al (approximately 1.5% silica and 98.5% alumina, obtained from Sasol North America, Houston, Tex.), 0.3 g/in$^3$ sub-micron Ce/Zr composite (approximately 30% $CeO_2$ and having an average crystallite size less than 0.5 micrometer, commercially available) and 0.05 g/in$^3$ $ZrO_2$. Pt amine salt was impregnated onto the Si/Al support to achieve the desirable loading. The Pt/Si/Al powder was then milled to reduce the particle size such that 90% of the particles were less than 5 micrometer. The Ce/Zr composite was added during the milling stage. An additional Zr component was added as a binder during the milling stage as zirconyl acetate sol. The pH of the resulting slurry was adjusted with acetic acid to achieve a value between 3.5 and 4.5. The washcoat was applied by immersing the substrate into the slurry. The excess slurry was blown-out of the monolith by using an air knife. The sample was dried at 110° C. for 2 hours then calcined in an oven at 450° C. for 1 hour in air. Sample A was then thermally aged at 700° C. for 4 hours in flowing air and steam.

Example 2

Preparation of Sample B

Sample B was prepared by washcoating a 1" diameter×3" long SiC wall-flow substrate (58% porosity, 300 cell/square inch, 12 mil wall thickness). The wall-flow substrate was coated with a washcoat slurry containing 90 g/ft$^3$ Pt, 0.6 g/in$^3$ sub-micron alumina (commercially available), 0.3 g/in$^3$ sub-micron Ce/Zr composite (approximately 30% $CeO_2$ and having an average crystallite size less than 0.5 micrometer, commercially available) and 0.05 g/in$^3$ $ZrO_2$. The sub-micron alumina was already dispersed in water by the manufacturer and had an average particle size of 40 nanometers. The washcoat slurry was free of precious metal, and the washcoat was applied by immersing the substrate into the slurry. The excess slurry was blown-out by using an air knife. The sample was dried at 110° C. for 2 hours then calcined in an oven at 450° C. for 1 hour. The resulting sample was then immersed into Pt amine salt solution to pick up desirable amount of Pt. This sample was then calcined again at 450° C. for 1 hour. Sample B was then was thermally aged at 700° C. for 4 hours in flowing air and steam.

Example 3

Preparation of Sample C

Sample C was prepared by washcoating a 1" diameter×3" long SiC wall-flow substrate (58% porosity, 300 cell/square inch, 12 mil wall thickness). The wall-flow substrate was coated with a washcoat slurry containing 90 g/ft$^3$ Pt, 0.6 g/in$^3$ Siralox® Si/Al (approximately 1.5% silica and 98.5% alumina, obtained from Sasol North America (Houston, Tex.)), 0.3 g/in$^3$ sub-micron alumina (commercially available), 0.3 g/in$^3$ Ce/Zr composite (containing about 30% $CeO_2$ and having an average crystallite size around 5 micrometers, commercially available) and 0.05 g/in$^3$ $ZrO_2$. The sub-micron alumina was already in a dispersed form and was coated on the substrate alone as a pre-coat. The sub-micron alumina was then calcined at 450° C. for 1 hour. The second slurry was prepared as follows. The Pt amine salt was impregnated onto the Siralox® support to achieve the desirable loading. The Pt/Siralox® Si/Al powder was then milled to reduce the particle size such that 90% of the particles were less than 5 micrometers. The Ce/Zr composite was added during the milling stage. An additional Zr component was added as a binder during the milling stage as zirconyl acetate sol. The pH of the resulting slurry was adjusted with acetic acid to achieve a value between 3.5 and 4.5. The washcoat was applied by immersing the substrate into the slurry. The excess slurry was blown-out by using an air knife. The sample was dried at 110° C. for 2 hours and then calcined in an oven at 450° C. for 1 hour in air. Sample C was then thermally aged at 700° C. for 4 hours in flowing air and steam.

Example 4

Preparation of Sample D

Sample D was prepared by washcoating a 1" diameter×3" long SiC wall-flow substrate (58% porosity, 300 cell/square inch, 12 mil wall thickness). The wall-flow substrate was coated with a washcoat slurry containing 90 g/ft$^3$ Pt, 0.6 g/in$^3$ sub-micron alumina (commercially available), 0.3 g/in$^3$ sub-micron sized $CeO_2$ (having an average particle size of 11 nanometers, commercially available) and 0.05 g/in$^3$ $ZrO_2$. The sub-micron alumina was already dispersed in water by the manufacturer and had an average particle size of 40 nanometers. The washcoat slurry was free of precious metal, and the washcoat was applied by immersing the substrate into the slurry. Excess slurry was blown-out by using an air knife. The sample was dried at 110° C. for 2 hours then calcined in an oven at 450° C. for 1 hour in air. The resulting sample was then immersed into Pt amine salt solution to pick up desirable amount of Pt. The sample was again calcined at 450° C. for 1 hour. Sample D was thermally aged at 700° C. for 4 hours in flowing air and steam.

Examples 5

Preparation of Sample E

Sample E was prepared by washcoating a 1" diameter×3" long SiC wall-flow substrate (58% porosity, 300 cell/square inch, 12 mil wall thickness). The wall-flow substrate was coated with a washcoat slurry containing 90 g/ft$^3$ Pt, 0.6 g/in$^3$ Siralox® Si/Al (approximately 1.5% silica and 98.5% alumina, obtained from Sasol North America (Houston, Tex.)), 0.3 g/in$^3$ sub-micron Ce/Zr composite (about 30% $CeO_2$ and having an average crystallite size less than 0.5 micrometer, commercially available) and 0.05 g/in$^3$ $ZrO_2$. The Pt amine salt was impregnated onto the Siralox® support to achieve the desirable loading. The Pt/Siralox® Si/Al powder was then milled to reduce the particle size such that 90% of the particles were less than 5 micrometers. The Ce/Zr composite was added during the milling stage. An additional Zr component was added as a binder during the milling stage as zirconyl acetate sol. The pH of the resulting slurry was adjusted with acetic acid to achieve a value between 3.5 and 4.5. The washcoat was applied by immersing the substrate into the slurry. The excess slurry was blown-out by using an air knife. The sample was dried at 110° C. for 2 hours and then calcined in an oven at 450° C. for 1 hour in air. Sample E was then thermally aged at 700° C. for 4 hours in flowing air and steam.

Example 6

Preparation of Sample F

Sample F was prepared by washcoating a 1" diameter×3" long SiC wall-flow substrate (58% porosity, 300 cell/square inch, 12 mil wall thickness). The wall-flow substrate was coated with a washcoat slurry containing 90 g/ft$^3$ Pt, 0.6 g/in$^3$ sub-micron alumina (commercially available), 0.3 g/in$^3$ sub-micron sized $CeO_2$ (having an average particle size of 11 nanometers, commercially available) and 0.05 g/in$^3$ $ZrO_2$. The sub-micron alumina was already dispersed in water by the manufacturer and had an average particle size of 40 nanometers. The washcoat slurry was made by combining the different slurry components. Pt amine salt was then added to the slurry drop-wise to effect the precipitation of Pt on the solid supports. The washcoat was applied by immersing the substrate into the slurry. The excess slurry was blown-out by using an air knife. The sample was dried at 110° C. for 2 hours then calcined in an oven at 450° C. for 1 hour in air. Sample F was then thermally aged at 700° C. for 4 hours in flowing air and steam.

Example 7

Preparation of Sample G

Sample G was prepared by washcoating a 1" diameter×3" long SiC wall-flow substrate (58% porosity, 300 cell/square inch, 12 mil wall thickness). The wall-flow substrate was coated with a washcoat slurry containing 90 g/ft$^3$ Pt, 0.6 g/in$^3$ sub-micron alumina (commercially available), 0.3 g/in$^3$ sub-micron Ce/Zr composite (about 30% $CeO_2$ and having an average crystallite size less than 0.5 micrometer, commercially available) and 0.05 g/in$^3$ $ZrO_2$. The Pt amine salt was impregnated onto the sub-micron alumina to achieve the desirable loading. The Pt/alumina powder was then milled to break the agglomerates such that 90% of the particles were less than 5 micrometers. The Ce/Zr composite was added during the milling stage. An additional Zr component was added as a binder during the milling stage as zirconyl acetate sol. The pH of the resulting slurry was adjusted with acetic acid to achieve a value between 3.5 and 4.5. The washcoat was applied by immersing the substrate into the slurry. The excess slurry was blown-out by using an air knife. The sample was dried at 110° C. for 2 hours then calcined in an oven at 450° C. for 1 hour in air. Sample G was then thermally aged at 700° C. for 4 hours in flowing air and steam.

Example 8

Preparation of Sample H

Sample H was prepared by washcoating a 1" diameter×3" long SiC wall-flow substrate (58% porosity, 300 cell/square inch, 12 mil wall thickness). The wall-flow substrate was coated with a washcoat slurry containing 90 g/ft$^3$ Pt, 0.9 g/in$^3$ sub-micron alumina (in powder form having an average crystalline size of 40 nanometers, commercially available) and 0.05 g/in$^3$ $ZrO_2$. The Pt amine salt was impregnated onto the sub-micron alumina to achieve the desirable loading. The Pt/alumina powder was then milled to break the agglomerates such that 90% of the particles were less than 5 micrometers. The Ce/Zr composite was added during the milling stage. An additional Zr component was added as a binder during the milling stage as zirconyl acetate sol. The pH of the resulting slurry was adjusted with acetic acid to achieve a value between 3.5 and 4.5. The washcoat was applied by immersing the substrate into the slurry. The excess slurry was blow-out by using an air knife. The sample was dried at 110° C. for 2 hours and then calcined in an oven at 450° C. for 1 hour. Sample H was then thermally aged at 700° C. for 4 hours in flowing air and steam.

Example 9

Preparation of Samples I to L

Samples I through L were prepared by washcoating a 1.5" diameter×3" long, aluminum titanate, wall-flow substrate (51% porosity, 300 cell/square in, 13 mil wall thickness). The wall-flow substrate was coated with a washcoat slurry containing 90 g/ft$^3$ Pt, 0.7 g/in$^3$ Siralox® Si/Al (approximately 1.5% silica and 98.5% alumina, obtained from Sasol North America (Houston, Tex)), and 0.035 g/in$^3$ $ZrO_2$. The Pt amine salt was impregnated onto the Siralox® support to achieve the desirable loading. The Pt/Siralox® powder was then milled to reduce the particle size. The final particle sizes were 90% less than 2.0, 5.5, 3.6 and 8.5 micrometers, for Sample I, J, K, and L, respectively. The Zr component was added as a binder the milling stage as zirconyl acetate sol during. The pH of the resulting slurry was adjusted with acetic acid to achieve a value between 3.5 and 4.5. The washcoat was applied by immersing the substrate into the slurry. The excess slurry was blown-out by using an air knife. The samples were dried at 110° C. for 2 hours and then calcined in an oven at 450° C. for 1 hour in air. The samples were thermally aged at 700° C. for 4 hours with flowing air and steam and were then aged at 800° C. for 4 hours with flowing air and steam.

Example 10

Preparation of Samples M and N

Samples M to N were prepared by washcoating a 1.5" diameter×3" long, aluminum titanate, wall-flow substrate (51% porosity, 300 cell/square in, 13 mil wall thickness). The wall-flow substrate was coated with a washcoat slurry containing 90 g/ft$^3$ Pt, 0.7 g/in$^3$ sub-micron alumina (in powder form having an average crystalline size of 40 nanometers, commercially available) and 0.035 g/in$^3$ $ZrO_2$. The Pt amine salt was impregnated onto the alumina powder to achieve the desirable loading. The Pt/alumina powder was then milled to break the agglomerate. The final particle sizes were 90% less than 5.5 and 4.7 micrometers, for Sample M and N, respectively. The Zr component was added as a binding agent during the milling stage as zirconyl acetate sol. The pH of the resulting slurry was adjusted with acetic acid to achieve a value between 3.5 and 4.5. The washcoat was applied by immersing the substrate into the slurry. The excess slurry was blown-out by using an air knife. The samples were dried at 110° C. for 2 hours and then calcined in an oven at 450° C. for 1 hour in air. The samples were thermally aged at 700° C. for 4 hours with flowing air and steam and were then aged again at 800° C. for 4 hours with flowing air and steam.

Example 11

Comparison of Pressure Drop between Sample E and Sample G

Figure 3:
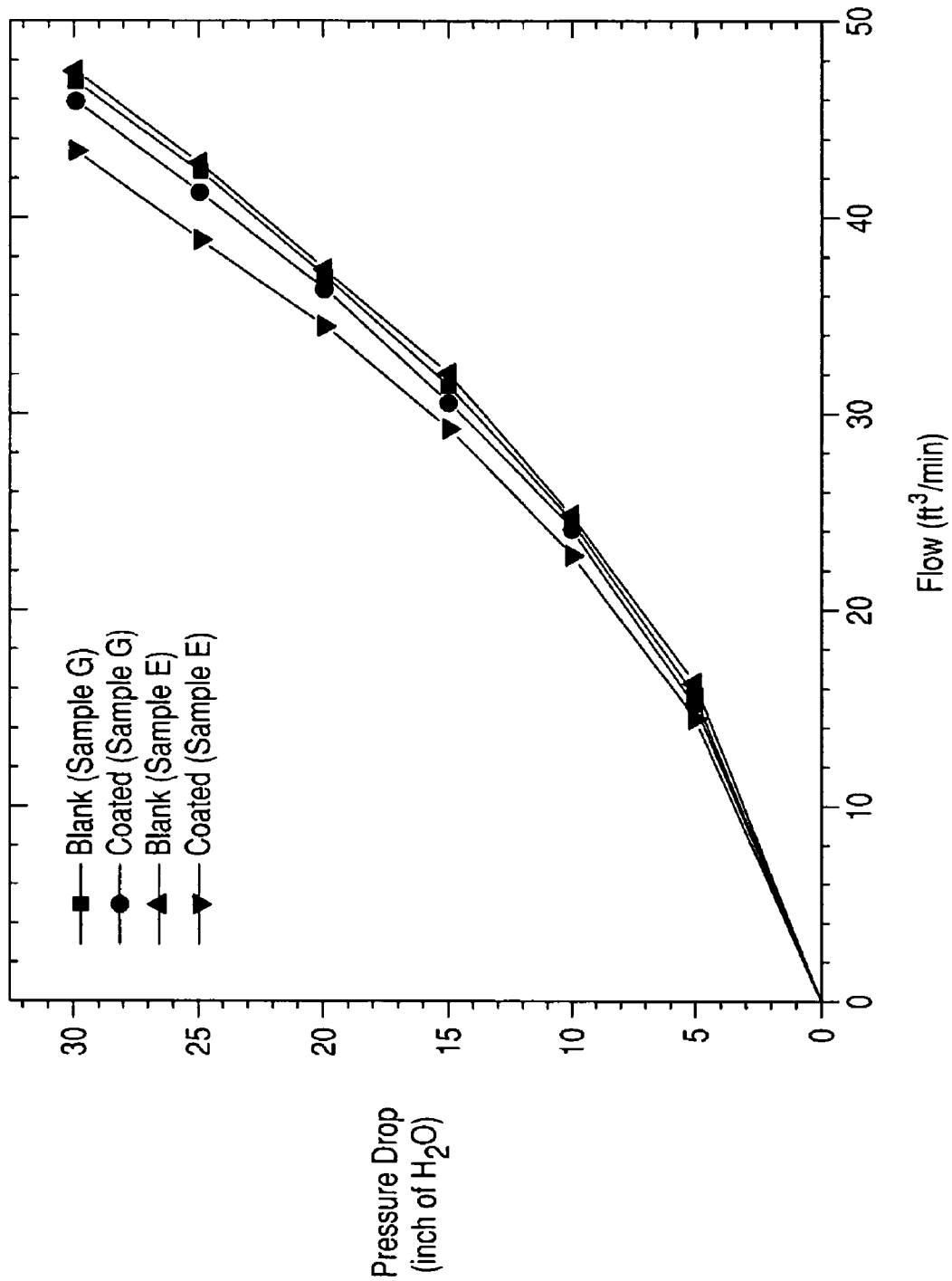
FIG. 3 shows a comparison of pressure drop across a wall-flow substrate with and without application of an ultra thin catalyst washcoat containing sub-micron particles.

Samples E and G were prepared as described hereinabove. Pressure changes were measured across coated and uncoated wall-flow substrates. FIG. 3 shows the pressure drop before and after application of a washcoat on a filter substrate. A substrate coated with a sub-micron washcoat slurry (Sample G), had a marginal increase in pressure drop compared to that of the pre-coated substrate. On the other hand, a substrate coated with a conventional slurry (Sample E) had a substantially higher pressure drop.

Example 12

Light-off Test Over 700° C. Aged Samples (Samples A through H)

Samples A through H were prepared as described hereinabove.

The samples were tested in a flow reactor system with a feed containing 1000 ppm CO, 167 ppm propene, 10% $O_2$ and 10% water. The system was equipped with CO, HC, $CO_2$ analyzers, which were used to determine the conversion efficiency of a catalyst. A catalyst was first saturated with the feed at 90° C. After a period of stabilization at 90° C., the temperature was ramped to 300° C. at 20° C./minute. The concentrations of reactants and products were continuously monitored and recorded. The conversion of CO or HC at various times were calculated as a relative difference between the concentration in feed (without passing the catalyst) and the resulting concentration (after passing through the catalyst).

Figure 5:
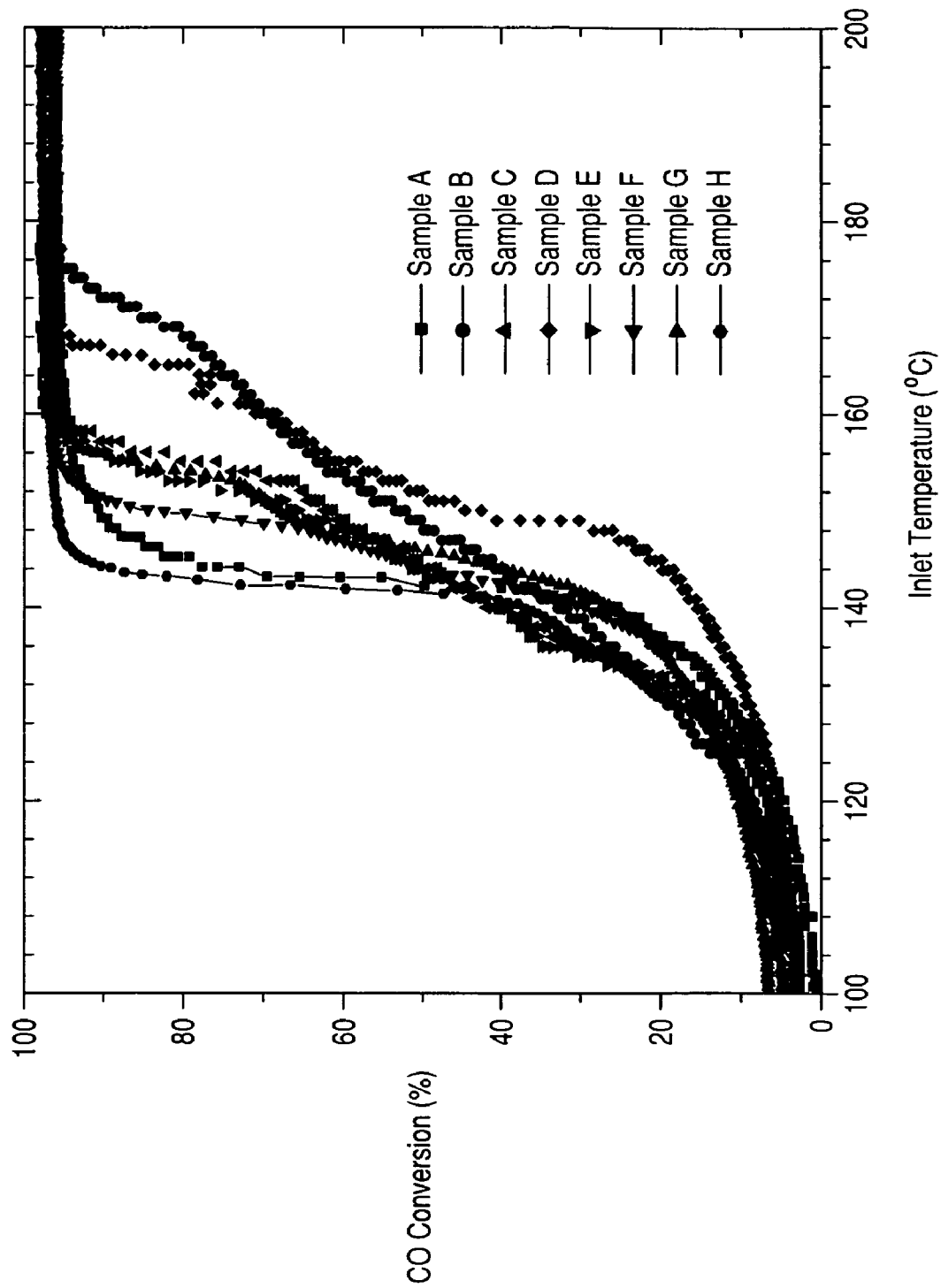
FIG. 5 shows a comparison of carbon monoxide conversion at various temperatures across a wall-flow substrate coated with various catalyst washcoats.

FIG. 5 shows the reactor test results of Samples A to H. As shown in FIG. 5 samples H, A and F, all of which were coated with a washcoat containing sub-micron particles, were among the most active for carbon monoxide (CO) conversion.

Example 13

CO Conversion Over 850° C. Aged Samples (Samples I through N)

Samples I through N were prepared as described hereinabove.

The samples were tested in a flow reactor system with a feed containing 1000 ppm CO, 167 ppm propene, 10% $O_2$ and 10% water. The system was equipped with CO, HC, $CO_2$ analyzers, which were used to determine the conversion efficiency of a catalyst. A catalyst was first saturated with the feed at 90° C. After a period of stabilization at 90° C., the temperature was ramped to 300° C. at 20° C./minute. The concentrations of reactants and products were continuously monitored and recorded. The conversion of CO or HC at various times were calculated as a relative difference between the concentration in feed (without passing the catalyst) and the resulting concentration (after passing through the catalyst).

Figure 6:
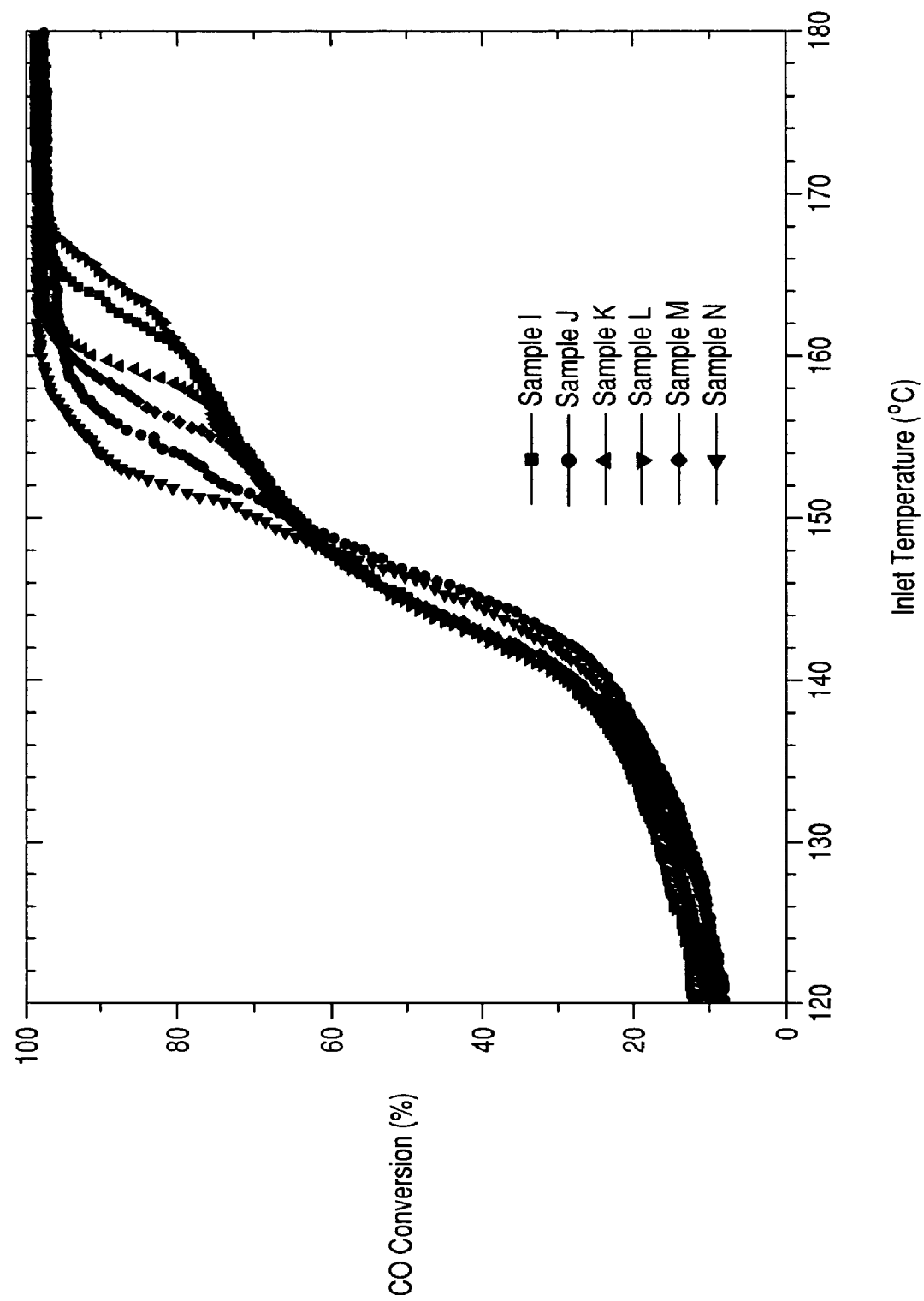
FIG. 6 shows a comparison of carbon monoxide conversion at various temperatures across a wall-flow substrate coated with various catalyst washcoats.

FIG. 6 shows the reactor test results of Samples I to N after 850° C. aging. As shown in FIG. 6 sample N, which was coated with a washcoat containing sub-micron particles, was among the most active for carbon monoxide (CO) conversion.

Example 14

HC Conversion Over 850° C. Aged Samples (Samples I through N)

Samples I through N were prepared as described hereinabove.

The samples were tested in a flow reactor system with a feed containing 1000 ppm CO, 167 ppm propene, 10% $O_2$ and 10% water. The system was equipped with CO, HC, $CO_2$ analyzers, which were used to determine the conversion efficiency of a catalyst. A catalyst was first saturated with the feed at 90° C. After a period of stabilization at 90° C., the temperature was ramped to 300° C. at 20° C./minute. The concentrations of reactants and products were continuously monitored and recorded. The conversion of CO or HC at various times were calculated as a relative difference between the concentration in feed (without passing the catalyst) and the resulting concentration (after passing through the catalyst).

FIG. 7 shows the reactor test results of Samples I to N after 850° C. aging. As shown in FIG. 7 samples N, which was coated with a washcoat containing sub-micron particles, was the best for hydrocarbon (HC) conversion.

What is claimed is:

1. An emission treatment system for a diesel engine comprising a soot filter comprising a wall flow filter substrate including porous walls, said soot filter having dispersed thereon one or more catalyst washcoat compositions, at least one catalyst washcoat composition consisting essentially of sub-micron particles and catalyst, the washcoat composition permeating the porous walls.

2. The emission treatment system of claim 1, wherein said sub-micron particles range in size from about 0.01 to about 0.5 microns.

3. The emission treatment system of claim 1, wherein said sub-micron particles are sub-micron particles of one or more base metal oxides selected from the group consisting of alumina, zirconia, titanium oxide, magnesium oxide, hafnium oxide, lanthanum oxide, yttrium oxide, silicon oxide, mixtures thereof, and any of said base metal oxides containing a platinum group metal.

4. The emission treatment system of claim 1, wherein said sub-micron particles are sub-micron alumina, silica-alumina, or said alumina or silica-alumina containing a platinum group metal.

5. The emission treatment system of claim 1, wherein said sub-micron particles are co-formed sub-micron ceria-zirconia composite.

6. The emission treatment system of claim 1, wherein said washcoat composition further comprises one or more ziolites.

7. The emission treatment system of claim 1, wherein said soot filter is a wall flow monolith having porous walls enclosing a plurality of passages coated with one or more of said washcoat compositions.

8. The emission treatment system of claim 7, wherein said wall flow monolith has a porosity from about 40% to about 75%.

9. The emission treatment system of claim 8, wherein said washcoat composition further comprises a platinum group metal and said platinum is contained on said soot filter in an amount from 0.1 to 200 g/ft$^3$.

10. The emission treatment system of claim 9, wherein said platinum group metal is zone coated at different concentrations on respective upstream and downstream portions of said soot filter.

11. The emission treatment system of claim 9, wherein the washcoat composition is effective for oxidation of one or more of hydrocarbons, carbon monoxide and nitrogen oxides in the exhaust gas of a diesel engine.

12. The emission treatment system of claim 9, wherein the washcoat composition contains a ceria-zirconia composite containing praseodymia effective for regenerating the soot filter.

13. The emission treatment system of claim 7, wherein said soot filter is coated contiguously with at least two layers of said sub-micron washcoat compositions.

14. The emission treatment system of claim 13, wherein said contiguous washcoat layers have separate catalytic functions.

15. The emission treatment system of claim 7, wherein pores in the porous walls are not occluded to reduce build up of backpressure in the filter.

16. The emission treatment system of claim 2, wherein the filter comprises a wall flow filter having a porosity of from about 40 to about 65% and a mean pore size from about 5 to 30 microns.

17. The emission treatment system of claim 16, wherein said washcoat composition further comprises a platinum group metal and said platinum is contained on said soot filter in an amount from 0.1 to 200 g/ft$^3$.

18. The emission treatment system of claim 17, wherein said platinum group metal is dispersed on a refractory metal oxide support having a crystallite size of less than about 40 nanometers.

19. The emission treatment system of claim 18, wherein said washcoat comprises a refractory metal oxide having a particle size of less than about 11 nanometers.

20. The emission treatment system of claim 19, wherein the washcoat is processed to break agglomerates such that 90% of the particles are less than 5 microns.

21. The emission treatment system of claim 16, wherein said washcoat composition further comprises a platinum group metal and said platinum is contained on said soot filter in an amount from 20 to 80 g/ft$^3$.

22. The emission treatment system of claim 16, wherein said washcoat composition further comprises a platinum group metal and said platinum is contained on said soot filter in an amount from 0.1 to 10 g/ft$^3$.

\* \* \* \* \*